(12) United States Patent
O'Leary (10) Patent No.: US 8,973,375 B2
(45) Date of Patent: Mar. 10, 2015

(54) SHIELDING FOR A GAS TURBINE ENGINE COMPONENT

(75) Inventor: Mark O'Leary, Zionsville, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 922 days.

(21) Appl. No.: 12/634,604

(22) Filed: Dec. 9, 2009

(65) Prior Publication Data

US 2010/0162717 A1  Jul. 1, 2010

Related U.S. Application Data

(60) Provisional application No. 61/203,982, filed on Dec. 31, 2008.

(51) Int. Cl.
F02C 7/24 (2006.01)
F01D 5/08 (2006.01)
F01D 5/28 (2006.01)

(52) U.S. Cl.
CPC . *F01D 5/284* (2013.01); *F02C 7/24* (2013.01); *Y02T 50/672* (2013.01); *Y02T 50/675* (2013.01); *F05D 2260/30* (2013.01); *F05D 2260/231* (2013.01)
USPC ............... 60/796; 60/798; 415/177; 415/178; 415/115; 416/224; 416/229 A; 416/95

(58) Field of Classification Search
USPC .......................... 60/752, 753, 805, 796, 798; 415/175–178, 134–135, 138–139, 115; 416/224, 229 R, 229 A, 230, 95, 96 R, 416/96 A, 97 R; 403/348, 353; 411/349, 411/549, 553
See application file for complete search history.

(56) References Cited

U.S. PATENT DOCUMENTS

| | | | | |
|---|---|---|---|---|
| 1,360,880 A * | 11/1920 | Buchholtz | ...................... | 40/200 |
| 2,571,641 A * | 10/1951 | Wing | ............................. | 411/141 |
| 4,749,029 A * | 6/1988 | Becker et al. | .................... | 165/47 |
| 4,838,031 A * | 6/1989 | Cramer | ........................... | 60/753 |
| 5,083,424 A | 1/1992 | Becker | | |
| 5,331,816 A | 7/1994 | Able et al. | | |
| 5,363,643 A * | 11/1994 | Halila | .............................. | 60/796 |
| 5,553,455 A | 9/1996 | Craig et al. | | |
| 5,799,491 A * | 9/1998 | Bell et al. | ......................... | 60/752 |
| 6,113,349 A * | 9/2000 | Bagepalli et al. | ............. | 415/135 |
| 6,351,949 B1 | 3/2002 | Rice et al. | | |
| 6,557,338 B2 * | 5/2003 | Holme et al. | ................. | 60/226.2 |
| 6,652,228 B2 | 11/2003 | Tiemann | | |
| 6,884,030 B2 | 4/2005 | Darkins, Jr. et al. | | |
| 6,932,566 B2 | 8/2005 | Suzumura et al. | | |
| 2005/0092566 A1 | 5/2005 | Good et al. | | |
| 2005/0260034 A1 | 11/2005 | Arbona | | |
| 2006/0239814 A1 * | 10/2006 | Uwami et al. | ................. | 415/134 |

* cited by examiner

*Primary Examiner* — Phutthiwat Wongwian
*Assistant Examiner* — Steven Sutherland
(74) *Attorney, Agent, or Firm* — Krieg DeVault LLP (57) ABSTRACT

One embodiment of the present application includes a hot section component of a gas turbine engine having a covering. The covering includes a protrusion and is attached to the hot section component though a flexible retainer. In one form the covering is made from ceramic matrix composite. The flexible retainer has a closed position and an open position. The retainer secures the protrusion to the hot section component when it engages part of the protrusion when in the closed position.

21 Claims, 6 Drawing Sheets

SHIELDING FOR A GAS TURBINE ENGINE COMPONENT

CROSS REFERENCE TO RELATED APPLICATIONS

The present application claims the benefit of U.S. Provisional Patent Application 61/203,982, filed Dec. 31, 2008, and is incorporated herein by reference.

GOVERNMENT RIGHTS

The present application was made with the United States government support under Contract No. N00421-01-C-0069, awarded by the United States Navy. The United States government has certain rights in the present application.

TECHNICAL FIELD

The present invention generally relates to gas turbine engine components, and more particularly, but not exclusively, to shielding components in a hot section of a gas turbine engine.

BACKGROUND

Increasing the efficiency and performance of gas turbine engines remains an area of interest. Some existing systems have various shortcomings relative to certain applications. Accordingly, there remains a need for further contributions in this area of technology.

SUMMARY

One embodiment of the present invention is a unique shielding for a gas turbine engine component. Other embodiments include apparatuses, systems, devices, hardware, methods, and combinations for shielding gas turbine engine components. Further embodiments, forms, features, aspects, benefits, and advantages of the present application shall become apparent from the description and figures provided herewith.

DETAILED DESCRIPTION OF SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
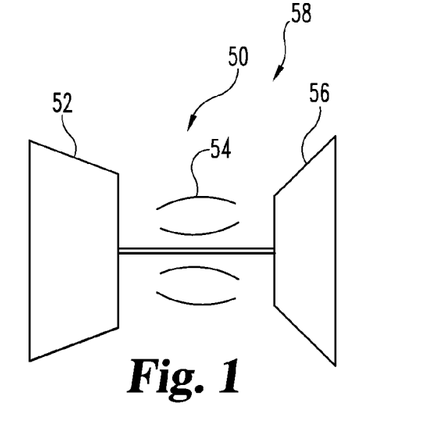
FIG. 1 is a schematic of a gas turbine engine.

FIG. 1 depicts an embodiment of a gas turbine engine 50, which includes a compressor 52, a combustor 54, and a turbine 56. Airflow entering the gas turbine engine 50 is compressed by the compressor 52 before being mixed with fuel and burned in the combustor 54 to create combustor flow. The turbine 56 extracts energy from the combustor flow to drive the compressor 52 and other devices. A hot section 58 of the gas turbine engine 50 includes the combustor 54 and the turbine 56 which can be operated at relatively elevated temperatures. Among other components disposed within the gas turbine engine 50, the turbine 56 includes a series of vanes and rotatable blades.

The gas turbine engine 50 can take any variety of forms such as, but not limited to, turbofans, turboprops, and turboshafts. In some embodiments, the gas turbine engine 50 can be used as an aircraft powerplant. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2:
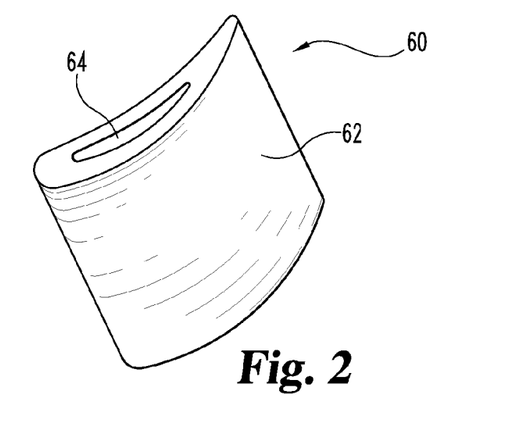
FIG. 2 is a perspective view of a component of a gas turbine engine.

Turning now to FIG. 2, one example of a hot section component is shown in a perspective view. A turbine vane 60 is depicted having a shielding 62 and a turbine vane spar 64. The shielding 62 is placed between a portion of the turbine vane spar 64 and the relatively hot combustor flow from the combustor 54 (shown in FIG. 1) and can provide a protective overlayer from the relatively elevated temperatures, among other possible uses. The shielding 62 can be made from a variety of materials/compositions including ceramic matrix composite (CMC) materials, alumino-silicates, and non-metallic materials, to set forth just a few non-limiting examples. The turbine vanes 60 can be used in upstream or downstream turbine stage locations within the turbine 56 (shown in FIG. 1). Various other components of the gas turbine engine 50 (shown in FIG. 1), including hot section components other than that depicted in FIG. 2, can also be protected by the shielding 62. For example, hot section components such as, but not limited to, combustors, bladetracks, turbine blades, and turbine frame supports, and any portions, assemblies, or parts, thereof, can also be protected using the devices and methods disclosed in the present application.

The shielding 62 is depicted as completely surrounding the shape of the turbine vane spar 64 in the embodiment of FIG. 2, but in other embodiments the shielding 62 can take on other shapes that do not completely surround the component. The shielding 62 can be shaped to cover only a portion of the component, and furthermore, can be shaped to interact with other shieldings 62 used to protect the component. To set forth just one non-limiting example, two adjoining shieldings 62 can cover two different sections of the component such as a suction side and a pressure side of a turbine vane. Some components can include any number of shieldings 62, some of which can include curved shapes, and some of which may be flat. In those embodiments including more than one shielding 62, the shieldings can overlap or can be arranged having a gap between the shieldings 62.

The shielding 62 is attached to the turbine vane spar 64 using a plurality of attachment members that will be described further below.

Figure 3:
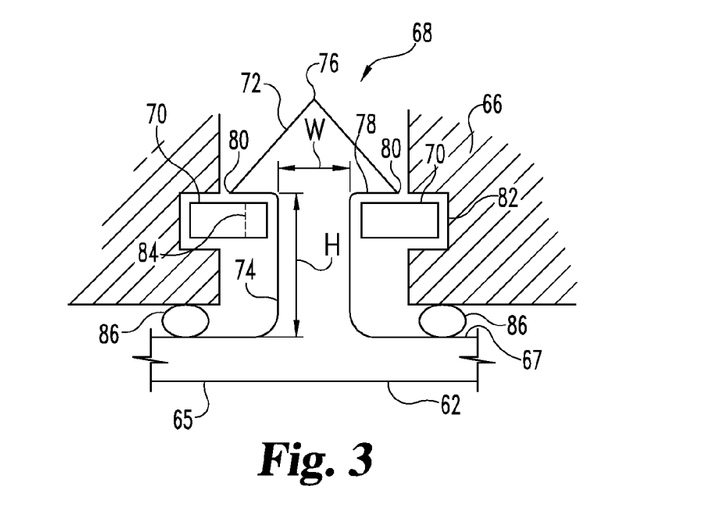
FIG. 3 is cross sectional view of one embodiment of a shielding and gas turbine engine component.

Turning now to FIG. 3, an embodiment is disclosed of the shielding 62 attached to a component 66. The shielding 62 has a hot side 65 and a cold side 67. In those embodiments where the component 66 is a hot section component, the hot side 65 is the side exposed to a combustor flow stream. The shielding 62 is coupled to the component 66 through an attachment member 68 and a retainer 70 captured within the component 66. The attachment member 68 includes a head 72 and a stem 74 that are configured to interact with the retainer 70. Many different shapes and sizes of the head 72 and the stem 74 are contemplated herein, some of which are described immediately below and other of which are illustrated and described further regarding FIG. 4.

The head 72 of the attachment member 68 is used to be engaged with the retainer 70 and includes a tip 76, a base 78, and lateral edges 80. The tip 76 is formed as an acute tip in the illustrative form, but other shapes are also contemplated herein. To set forth just a few non-limiting examples, the tip 76 can be rounded, spherical, conical, faceted, or chamfered, among others. The surface formed between the tip 76 and the lateral edges 80 can also take on a variety of forms, whether flat, curved, faceted, or otherwise. In some applications the head 72 can be nonsymmetrical. To set forth just one non-limiting example, one half of the head 72 shown in FIG. 3 can be removed to leave a head having a form similar to a fishhook. Other non-symmetric forms are also contemplated herein.

The base 78 is depicted as relatively flat, but can take on different shapes in other embodiments. To set forth one non-limiting example, the base 78 can have a surface form complementary to a surface form in the retainer 70. In another example, the base 78 can be angled relative to the stem 74, where the angle is either acute or obtuse to the stem 74. Some portions of the base 78 can have different shapes or forms. For example, one side of the base 78 can be curved and the other side flat. While both the base 78 and the retainer 70 in the illustrative embodiment have relatively flat surfaces, in some embodiments the surfaces can be a wave-like pattern or may be splined, to set forth just a few non-limiting examples.

In general, the head 72 will have a size in one dimension larger than the stem 74. For example, the lateral edges 80 in the illustrative embodiment are larger than the width W of the stem 74. The difference in size enables the lateral edges 80 to discourage the attachment member 68 from being decoupled from the retainer 70. In some embodiments the lateral edges 80 may be of a size and shape such that the attachment member 68 cannot be decoupled from the retainer 70 without causing damage, while in other embodiments the lateral edges 80 can be decoupled without damage. At some locations the lateral edges 80 may be the same size or smaller than a dimension of the stem 74. For example, the embodiment shown in FIG. 4 on the left hand side depicts the faceted attachment member 68a having the lateral edges 80 the same width of the stem 74a in at least one direction.

The stem 74 extends from the shielding 62 to the head 72. The stem 74 can have any height H from the shielding 62 and any width W. The height H can be the same or different size of the width W. In some embodiments, the stem 74 can be integrally formed with the shielding 62, in other embodiments the stem 74 can be a unitary member with the shielding 62, and in still other embodiments the stem 74 may be attached to the shielding 62. In one non-limiting example, the stem 74 can be a CMC braided tube that is integrated into a weave of the CMC shielding 62. The stem 74 can be rectangular, circular, conical, or any other shape. Furthermore, the stem 74 can vary in size and shape from the shielding 62 to the head 72. To set forth just one non-limiting example, the stem 74 can have a mid-section between the shielding 62 and the base 78 that is a different shape and/or a different size than other portions of the stem 74. Although the stem is depicted as extending at a right angle relative to the shielding 62, in other embodiments the stem can extend at any angle.

The retainer 70 is a device used to flexibly allow insertion of the attachment member 68 into the component 66. In some embodiments the retainer 70 can take the form of a split washer, a split ring, a snap ring, or a circlip, among other possible variations, and can be made from a variety of materials. In one non-limiting embodiment the retainer 70 is metallic. After the head 72 of the attachment member 68 is inserted through the retainer 70, the retainer 70 is closed thereby securing the attachment member 68 within the component 66. The retainer 70 can close on the stem 74 or can close and allow a gap between an edge of the retainer 70 and the stem 74 as is shown by a dashed line 84. When closed, the retainer 70 may grip the entire periphery of the stem 74 or may grip only a portion of it. In some forms the retainer 70 may have a barb or other type of protrusion that can be used to grip and/or anchor the retainer 70 to a receiving structure of the stem 74 or head 72. Such a receiving structure can take the form of a pocket or depression, to set forth just two non-limiting examples. The retainer 70 can be made with a relatively tight circular clearance hole, a relatively loose circular clearance hole, and may be made with slots in different directions which allow for the shielding 62 to be installed so that it is not overconstrained when the shielding 62 expands under thermal load. The retainer 70 can be made in a variety of sizes.

The retainer 70 can take forms other than a circular or semi-circular shape. In one non-limiting example, the retainer 70 can be composed of multiple, individual components that act in concert to allow insertion of the attachment member 68 into the component 66. For example, the retainer 70 can take the form of two linear springs that are installed in the component 66 on opposite sides of the attachment member 68. As the head 72 of the attachment member 68 is inserted, each of the respective linear springs will deform into a pocket 82 of the component 66 which captures the retainer 70. In another non-limiting example, the retainer 70 can take the form of one linear spring.

The pocket 82 can be machined, molded, or cast into the component 66, among other possible types of formation techniques. The pocket 82 can be made in a variety of sizes and shapes. Some shapes can be the same as the shapes of the retainer 70. The pocket 82 can allow for movement of the attachment member 68 and the retainer 70 in one or more directions. For example, the pocket 82 can be an elongated slot allowing for movement of the attachment member 68 in the direction of the slot. Other pockets can be relatively small such that enough room is provided for deflection of the flexible retainer 70, but minimal additional room is provided for movement of the attachment member 68. The relative sizing of the pocket 82 can allow the retainer 70 to bear against the component 66 when the shielding 62 is displaced under load, or may allow the attachment member 68 to bear against the component 66 when the shielding 62 is displaced. For example, if the pocket 82 has a greater depth than the size of the retainer 70, the attachment member 68 may engage an inner surface of the component 66 before the retainer 70 reaches the end of its permissible travel.

A seal 86 can be used between the shielding 62 and the component 66. The seal 86 can be made of a material which allows it to be compressed and, as a result, to provide a resistant force so that the shielding 62 is urged away from the component 66 when the seal 86 is compressed. In one non-limiting example, the seal 86 can be made from a ceramic rope which may encircle the base of the stem 74. The present application further contemplates that the seal 86 is functioning as a compressible member and does not have to provide a complete seal for a working fluid.

Figure 4:
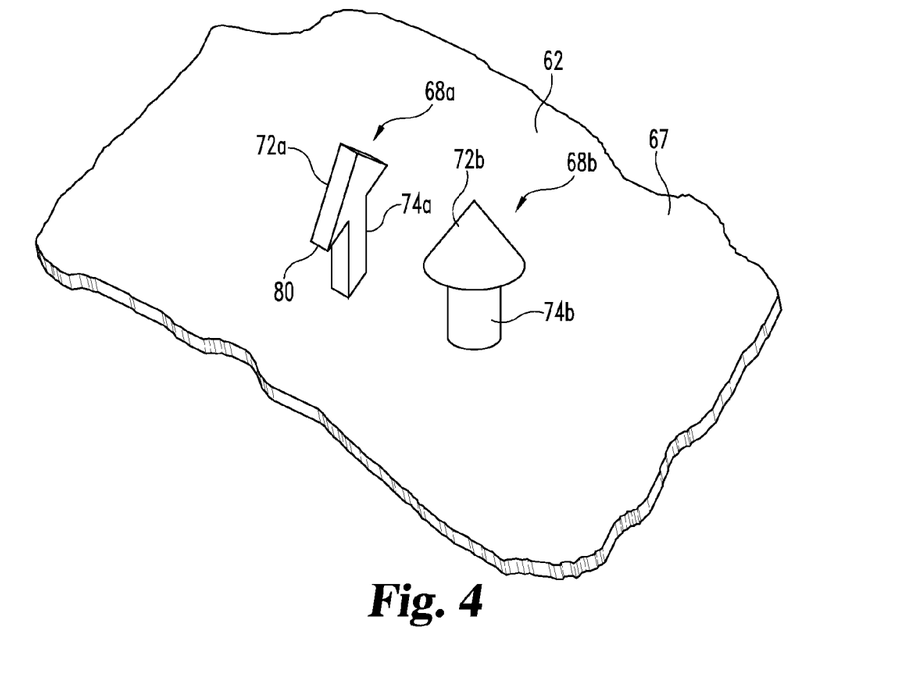
FIG. 4 is a perspective view of one embodiment of a shielding having attachment members.

Turning now to FIG. 4, the shielding 62 is shown having two different attachment members 68a and 68b projecting from the cold side 67 of the shielding 62. In other embodiments, the shielding 62 can include any number of other attachment members 68. Some embodiments of the shielding 62 can include a plurality of identical attachment members in shape and size. Other embodiments can include a plurality of attachment members having the same shape but different sizes. No limitation is intended herein regarding the numbers, types, sizes, shapes, or locations of the attachment members. The attachment member 68a includes a head 72a and a stem 74a with a faceted outer surface. The attachment member 68b includes a conical head 72b and a cylindrical stem 74b. Many other combinations of head shapes and stem shapes are also possible and are contemplated herein.

The shielding 62 depicted in FIG. 4 has a relatively thin thickness compared to its other dimensions. Though the total length and total width of the shielding 62 are not depicted in FIG. 4, it will be understood that the shielding 62 has a thickness smaller than either its width or length.

Figure 5:
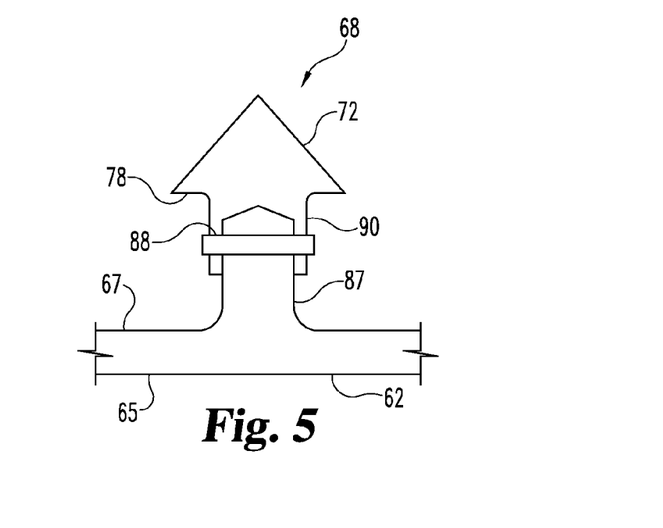
FIG. 5 is a cross sectional view of one embodiment of a shielding.

Turning now to FIG. 5, one embodiment of the shielding 62 is shown that includes the attachment member 68 having a different configuration than the attachment member 68 discussed above and shown in FIG. 3. The attachment member 68 shown in FIG. 5 includes an extension 87 protruding from the cold side 67 which is coupled to a separable head 72 via a fastener 88. In one form the extension 87 is coupled to the separable head 72 with a press fit. The shielding 62 can be a CMC material and the separable head 72 can be metallic. The head 72 includes a shank 90 which is adapted to receive the extension 87. In some embodiment, the extension 87 may include an aperture within which the shank 90 is received. A retainer can be used to couple to the extension 87, the shank 90, or both.

The fastener 88 can be a cylindrical or rectangular pin that is inserted through the head 72 and the extension 87 as is depicted in FIG. 5. The fastener 88 can take different geometric forms in other embodiments. In some applications the fastener 88 may only partially extend into the head 72 and the extension 87. Other arrangements are also contemplated herein. The fastener 88 can be flush with the side of the shank 90, it can be countersunk into the shank 90, and it can also extend past the surface of the shank 90 as depicted in FIG. 5. The fastener 88 can also have a different appearance on either side of the shank 90. To set forth one non-limiting example, one side of the shank 90 may have the fastener 88 extending out a given distance while the other side can have the fastener 88 flush with the surface of the shank 90.

The shank 90 of the head 72 can overlap the extension 87 by any distance. In some embodiments, the shank 90 can extend all the way down to the cold side 67. In addition, the extension 87 can extend up into the head 72 to any distance, including just below the base 78 of the head 72 and also up into a region above the base 78.

Figure 6:
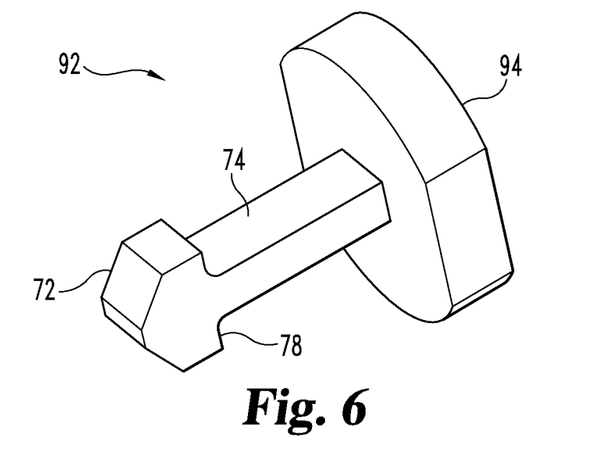
FIG. 6 is a view of one embodiment of a coupler.

Turning now to FIG. 6, another embodiment of the present application provides for a fastening device that includes a coupler 92 having the head 72, stem 74, and a foundation 94. The head 72 includes a base 78 larger than the stem 74 in one direction, but other embodiments can include a head 72 larger than the base 78 in more than one direction.

Figure 7:
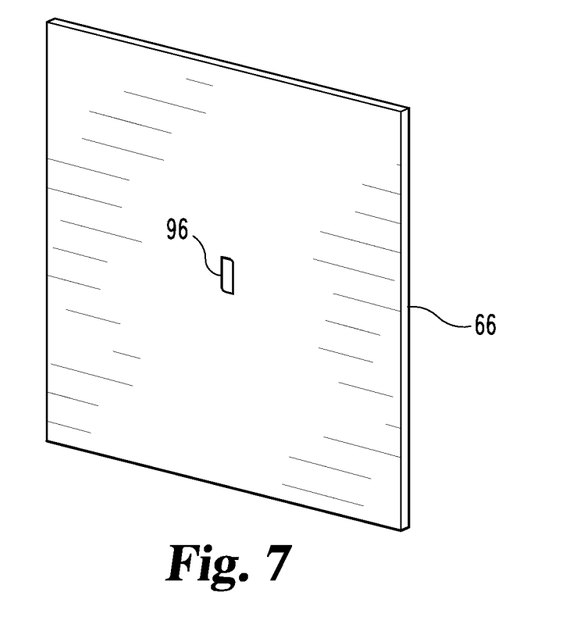
FIG. 7 is a partial view of one embodiment of a component.

FIG. 7 depicts the component 66 having a passage 96 large enough to receive the head 72 of the coupler 92 depicted in FIG. 6. In the illustrative form the passage 96 is rectangular in shape, but the passage 96 can take on different forms in other embodiments.

Figure 8A:
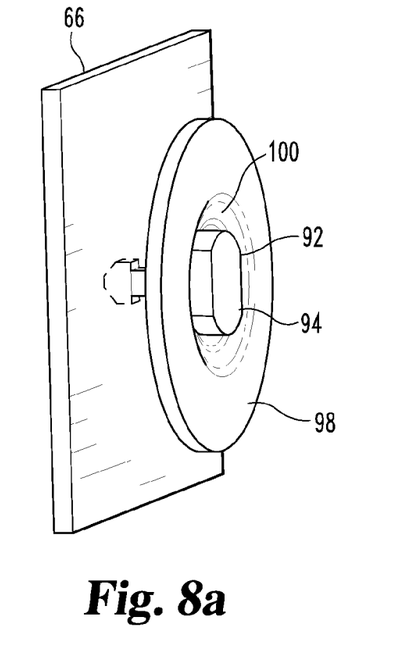
FIG. 8a is a view of one embodiment of a coupler and coupling member.
Figure 8B:
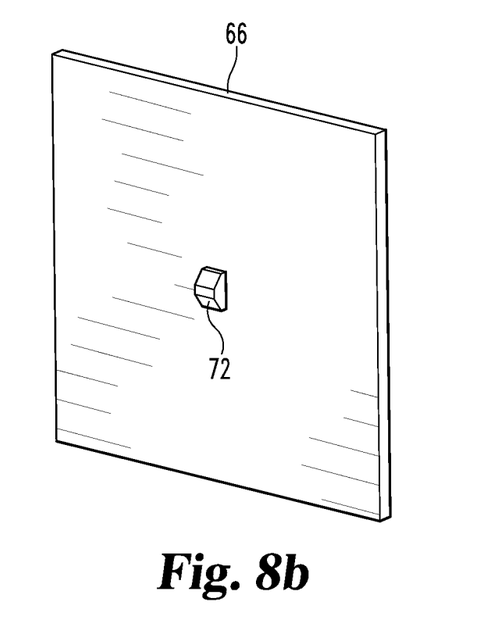
FIG. 8b is a view of one embodiment of a coupler and coupling member.
Figure 8C:
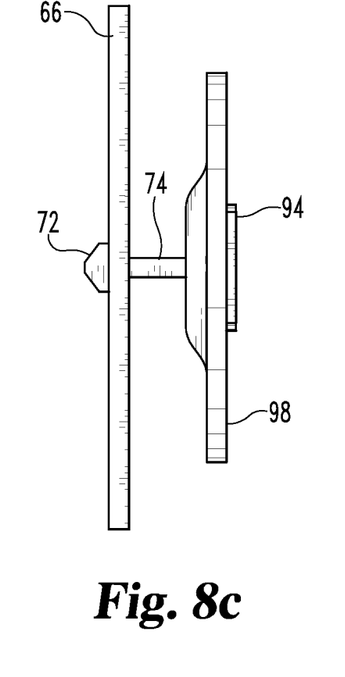
FIG. 8c is a view of one embodiment of a coupler and coupling member.
Figure 9A:
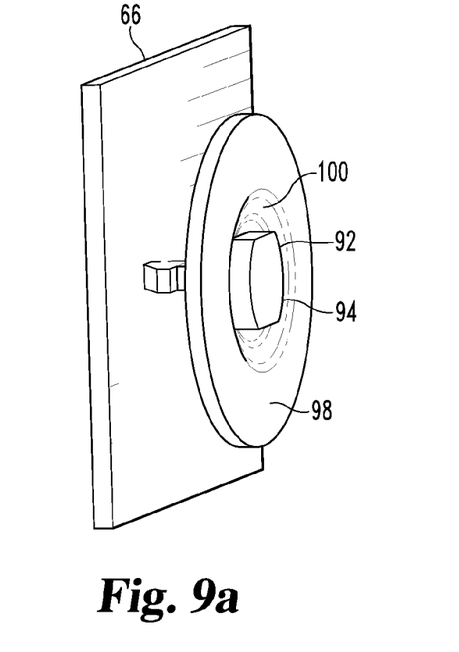
FIG. 9a is a view of one embodiment of a coupler and coupling member.
Figure 9B:
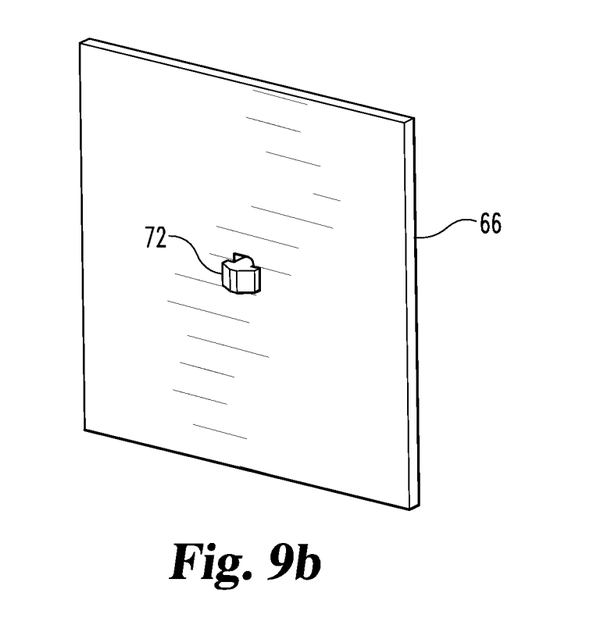
FIG. 9b is a view of one embodiment of a coupler and coupling member.
Figure 9C:
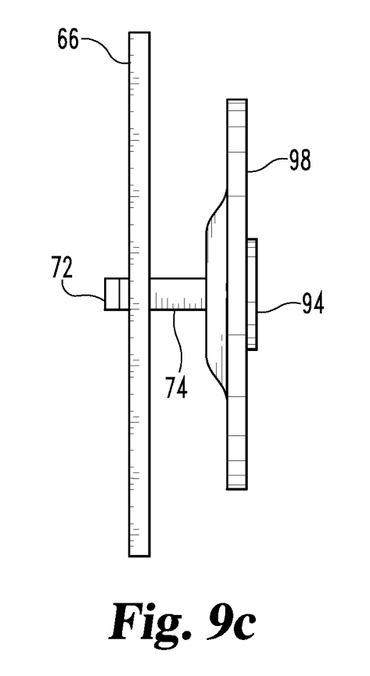
FIG. 9c is a view of one embodiment of a coupler and coupling member.

FIGS. 8a, 8b, 8c, 9a, 9b, and 9c depict an embodiment of the coupler 92 engaged with a coupling member 98 to further form a fastening device. The fastening device is used to couple the heat shielding 62 (not shown, but in one non-limiting form could be located between the component 66 and the foundation 94 of the coupler 92) to the component 66. The coupling member 98 is engaged with the coupler 92 as can be seen in FIGS. 8a and 9a. In some forms, however, the coupling member 98 can be integrally formed or attached to the coupler 92. The foundation 94 is received in an engagement portion 100 of the coupling member 98. The head 72 of the coupler 92 is inserted through the passage 96 formed in the component 66. Once the head 72 is inserted through the passage 96, the coupler 92 is turned to the orientation seen in FIGS. 9a and 9b such that the head 72 is in an orientation that it resists being withdrawn through the passage 96. The coupler 92 can be turned such that the foundation 94 slips within the engagement portion 100 of the coupling member 98, but in some forms the coupling member 98 can rotate with the coupler 92. In some embodiments a positive locking mechanism can be used to prevent the coupler 92 from being turned back to the orientation depicted in FIGS. 8a, 8b, and 8c after being rotated to the orientation depicted in FIGS. 9a, 9b, and 9c. Furthermore, a ring or rope seal or other high temperature elastic material can be used to preload the fastening device.

In one form the present application provides a gas turbine engine hot section cladding having a plurality of protrusions operable to couple the gas turbine engine hot section cladding to a hot section component, the plurality of protrusions having heads extending from stems that are located on a cold side of the gas turbine engine hot section cladding, the heads having widths greater than a portion of the respective stems.

One feature of the present application provides wherein the stems are unitary members of the gas turbine engine hot section cladding.

Another feature of the present application provides a plurality of retainer engagement members operable to be engaged with the heads and located between the heads and the cold side, the retainer engagement members having open positions and secured positions.

Yet another feature of the present application provides wherein the retainer engagement members are operable to bear against the protrusions.

Still another feature of the present application provides wherein the retainer engagement members are split rings having inner diameters that are adjustable for expanding and contracting when engaging with the protrusions.

Another feature of the present application provides wherein the heads include an acute tip for penetrating the inner diameter of the split ring.

Still another feature of the present application provides wherein the gas turbine engine hot section cladding is formed from a ceramic matrix composite.

Yet still another feature of the present application provides wherein the heads are formed from a material different than the material of the stems, and wherein the heads are coupled to the stems.

And still another feature of the present application provides wherein the heads are formed integral with the stems.

In another form the present application provides a hot section component of a gas turbine engine, a covering operable to be coupled to the hot section component and including a protrusion having a head with an engaging surface, and a resilient engagement member operable to be captured within the hot section component and adapted to receive the head, the resilient engagement member having a closed position and a passage position, the resilient engagement member is urged from the closed position to the passage position when the engaging surface of the head engages and is urged past the resilient engagement member, the resilient engagement member operable to move from the passage position toward the closed position when the engaging surface has passed the resilient engaging member.

One feature of the present application provides wherein the covering comprises a ceramic matrix composite material.

Another feature of the present application provides a device having a compressed state and an uncompressed state, the device disposed between the covering and the hot section component and providing a tension of the protrusion when the device is in the compressed state.

Still another feature of the present application provides wherein the device is a ceramic rope.

Yet still another feature of the present application provides wherein the resilient engagement member is a split washer including an inner diameter and a projection support edge for retaining the protrusion thereto when the protrusion is inserted through the inner diameter.

Still a further feature of the present application provides wherein the protrusion includes an enlarged head portion with a portion structured to bear against the resilient engagement member.

Yet still a further feature of the present application provides wherein the hot section component and the shielding form an airfoil shape.

In still another form the present application provides a gas turbine engine component, a panel, and means for coupling the panel to the gas turbine engine component.

In yet another form the present application provides inserting a protrusion of a thermal covering through an opening of a gas turbine engine component, engaging the protrusion with a flexible retainer located in the opening, and changing the shape of the flexible retainer as the protrusion is urged toward a fastened position past the flexible retainer.

Another feature of the present application provides resisting removal of the protrusion from the opening of the gas turbine engine.

Yet another feature of the present application provides wherein the resisting further includes engaging a head of the flexible retainer against a bearing surface of the flexible retainer.

Yet still another feature of the present application provides imparting a load to the thermal tile in a direction away from the gas turbine engine component.

Still another feature of the present application provides compressing a ceramic rope between the thermal tile and the gas turbine engine component.

Another aspect of the present application provides an apparatus, comprising a gas turbine engine hot section cladding coupled with a hot section component using a plurality of protrusions that extend through a plurality of openings, the plurality of protrusions having heads extending from stems, the heads having widths greater than a portion of the respective stems and operable to extend past a periphery of the openings such that the gas turbine engine hot section cladding is discouraged from being decoupled from the hot section component.

Yet another aspect of the present an apparatus, comprising a hot section component of a gas turbine engine, a covering operable to be coupled to the hot section component and including a protrusion having a head with an engaging surface, and a resilient engagement member operable to be captured within the hot section component and adapted to receive the head, the resilient engagement member having a closed position and a passage position, the resilient engagement member is urged from the closed position to the passage position when the engaging surface of the head engages and is urged past the resilient engagement member, the resilient engagement member operable to move from the passage position toward the closed position when the engaging surface has passed the resilient engaging member.

Still another aspect of the present application provides an apparatus, comprising a gas turbine engine member having a substructure and a panel that protects the substructure from a host gas environment, and a device for coupling the panel to the substructure, the device including a stem having a movable enlarged portion on a distal end of the stem, the movable enlarged portion shaped to pass a side of an opening formed in the gas turbine engine member when the substructure and panel are coupled and moved to an engaged position in which the movable enlarged portion is capable of engaging the side of the opening to discourage the substructure and the panel from being decoupled.

Still yet another aspect of the present application provides a method, comprising inserting a plurality of protrusions of a first member of a gas turbine engine hot section component through a plurality of openings formed in a second member of the gas turbine engine hot section component, the plurality of protrusions having associated heads, conveying the heads of the plurality of protrusions past a portion of the second member defining the plurality of openings, and discouraging a decoupling of the first member from the second member by coupling the heads with a portion of the second member.

While the invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected. Any experiments, experimental examples, or experimental results provided herein are intended to be illustrative of the present invention and should not be construed to limit or restrict the invention scope. Further, any theory, mechanism of operation, proof, or finding stated herein is meant to further enhance understanding of the present invention and is not intended to limit the present invention in any way to such theory, mechanism of operation, proof, or finding. In reading the claims, words such as "a", "an", "at least on", and "at least a portion" are not intended to limit the claims to only one item unless specifically stated to the contrary. Further, when the language "at least a portion" and/or "a portion" is used, the claims may include a portion and/or the entire item unless specifically stated to the contrary.

What is claimed is:

1. An apparatus, comprising:
a gas turbine engine hot section cladding coupled with a gas turbine engine blade using a plurality of protrusions, the hot section cladding, the gas turbine engine blade, and the protrusions being non-integral discrete components, the protrusions extending through a plurality of openings, the plurality of protrusions having heads extending from stems, the heads having widths greater than a portion of the respective stems and operable to extend past a periphery of the openings such that the gas turbine engine hot section cladding is discouraged from being decoupled from the gas turbine engine blade,
wherein the heads of the plurality of protrusions have an oblong shape and the openings have an oblong shape such that when the protrusions are in a first orientation the heads can pass through the openings and when the protrusions are in a second orientation different from the first orientation the heads resist being withdrawn through the openings;
wherein the heads have a tapered portion for guiding the heads into the openings
wherein the stem is attached to the hot section cladding, and
further including a plurality of retainer engagement members defining the openings and operable to be engaged with the heads, the retaining engagement members having open positions and closed positions.

2. The apparatus of claim 1, wherein the retainer engagement members are split rings having inner diameters that are adjustable for expanding and contracting when engaging with the heads.

3. The apparatus of claim 1, wherein the gas turbine engine hot section cladding is formed from a ceramic matrix composite.

4. The apparatus of claim 1, which further includes a gas turbine engine having the hot section component and gas turbine engine hot section cladding.

5. An apparatus, comprising:
a gas turbine engine hot section cladding coupled with a gas turbine engine blade using a plurality of protrusions, the hot section cladding, the gas turbine engine blade, and the protrusions being non-integral discrete components, the protrusions extending through a plurality of openings, the plurality of protrusions having heads extending from stems, the heads having widths greater than a portion of the respective stems and operable to extend past a periphery of the openings such that the gas turbine engine hot section cladding is discouraged from being decoupled from the gas turbine engine blade,
wherein the heads of the plurality of protrusions have an oblong shape and the openings have an oblong shape such that when the protrusions are in a first orientation the heads can pass through the openings and when the protrusions are in a second orientation different from the first orientation the heads resist being withdrawn through the openings;
wherein the heads have a tapered portion for guiding the heads into the openings
wherein the stem is attached to the hot section cladding, wherein each of the heads of the protrusions has an engaging surface, and
further including a resilient engagement member defining the opening, the resilient engagement member operable to be captured within the hot section component and adapted to receive the head, the resilient engagement member having a closed position and a passage position, the resilient engagement member is urged from the closed position to the passage position when the engaging surface of the head engages and is urged past the resilient engagement member, the resilient engagement member operable to move from the passage position toward the closed position when the engaging surface has passed the resilient engaging member.

6. The apparatus of claim 5, wherein the covering comprises a ceramic matrix composite material.

7. The apparatus of claim 5, which further includes a device having a compressed state and an uncompressed state, the device disposed between the covering and the hot section component and providing a tension of the protrusion when the device is in the compressed state.

8. The apparatus of claim 7, wherein the device is a ceramic rope.

9. The apparatus of claim 5, wherein the resilient engagement member is a split washer including an inner diameter and a projection support edge for retaining the protrusion thereto when the protrusion is inserted through the inner diameter.

10. The apparatus of claim 5, wherein the protrusion includes an enlarged head portion with a portion structured to bear against the resilient engagement member.

11. The apparatus of claim 5, wherein the hot section component and the shielding form an airfoil shape.

12. An apparatus, comprising:
a gas turbine engine hot section cladding coupled with a gas turbine engine blade using a plurality of protrusions, the hot section cladding, the gas turbine engine blade, and the protrusions being non-integral discrete components, the protrusions extending through a plurality of openings, the plurality of protrusions having heads extending from stems, the heads having widths greater than a portion of the respective stems and operable to extend past a periphery of the openings such that the gas turbine engine hot section cladding is discouraged from being decoupled from the gas turbine engine blade,
wherein the heads of the plurality of protrusions have an oblong shape and the openings have an oblong shape such that when the protrusions are in a first orientation the heads can pass through the openings and when the protrusions are in a second orientation different from the first orientation the heads resist being withdrawn through the openings;
wherein the heads have a tapered portion for guiding the heads into the openings.

13. The apparatus of claim 12, wherein the plurality of protrusions include at least some protrusions capable of being rotated from a decoupled position to a coupled position, wherein the oblong shape of the heads is rectangular shape and the oblong shape of the openings is rectangular shape, and the second orientation comprises the longer side of the rectangular shape heads to be positioned transverse the shorter side of the rectangular shape openings.

14. The apparatus of claim 12, wherein the gas turbine engine hot section cladding is formed from a ceramic matrix composite.

15. The apparatus of claim 12, which further includes a gas turbine engine having the gas turbine engine blade and gas turbine engine hot section cladding.

16. An apparatus, comprising:
a gas turbine engine member having a substructure and a panel that protects the substructure from a host gas environment; and
a device, discrete from the substructure, for coupling the panel to the substructure, the device including a stem having a movable enlarged portion integral with a distal end of the stem, the movable enlarged portion shaped to pass a side of an opening formed in the gas turbine engine member when the substructure and panel are coupled and to move to an engaged position in which the movable enlarged portion is capable of engaging the side of the opening to discourage the substructure and the panel from being decoupled, wherein a coupling member has engagement portions that define recessed portions and the device for coupling the panel to the substructure has foundations that are configured to be received in and slip within the recessed portions of the engagement portions.

17. The apparatus of claim 16, wherein the movable enlarged portion is capable of being rotated to the engaged position.

18. The apparatus of claim 17, wherein the stem and the movable enlarged portion are jointly rotated to the engaged position.

19. The apparatus of claim 16, wherein the movable enlarged portion includes a protrusion laterally offset from the stem.

20. The apparatus of claim 16, wherein the device includes a plurality of stems having movable enlarged portions.

21. The apparatus of claim 20, wherein the gas turbine engine includes a plurality of panels.

* * * * *